United States Patent [19]

Shingaki et al.

[11] 4,091,685

[45] May 30, 1978

[54] SPEED CHANGE UNIT FOR TILLER

[75] Inventors: Masamitsu Shingaki; Tomeo Umemoto; Mitsuhiro Sato, all of Sakai, Japan; Mikio Yuki, Vichy, France

[73] Assignee: Kubota, Ltd., Japan

[21] Appl. No.: 732,868

[22] Filed: Oct. 15, 1976

[30] Foreign Application Priority Data

Nov. 4, 1975 Japan .......................... 50-150310[U]
Dec. 27, 1975 Japan .......................... 50-179339[U]

[51] Int. Cl.² .............................................. F16H 3/08
[52] U.S. Cl. ............................................... 74/331
[58] Field of Search ............................ 74/331, 357

[56] References Cited

U.S. PATENT DOCUMENTS 3,885,446  5/1975  Pengilly .................. 74/331

Primary Examiner—Leonard H. Gerin
Attorney, Agent, or Firm—Kane, Dalsimer, Kane, Sullivan and Kurucz

[57] ABSTRACT

A speed change unit for a tiller comprising three shafts, two shift gears having a large width axially thereof and two driven gears, one of the driven gears being freely rotatably mounted on one of the shafts and selectively meshable with one of the shift gears and another gear being fixedly mounted on the same shaft and selectively meshable with one of the shift gears, thereby the rotation of one of the driven gears on the shaft can be delivered to a transmission system for axles via two transmission systems different in speed change ratio and same in the direction of transmission of rotation.

1 Claim, 7 Drawing Figures

SPEED CHANGE UNIT FOR TILLER

BACKGROUND OF THE INVENTION

The present invention relates to improvements in a speed change unit for a tiller comprising two gears fixedly mounted on one shaft, a driven gear mounted on another shaft and always meshing with one of the gears, a slidable gear mounted on further shaft and selectively meshing with the other gear or the driven gear.

According to the arrangement, at least four gears are necessary to change the directions of rotation of the slidable gear which transmits a power to a transmission systems for axles of wheels. Further, it is needed that the slidable gear has a large width axially thereof for providing a neutral position. This causes a width of a transmission case wide and a number of parts including the four gears makes a cost of the tiller high. This invention intends to overcome these problems.

SUMMARY OF THE INVENTION

A speed change unit for a tiller according to the present invention comprising a first shaft for speed change serving as an input shaft, a second shaft for speed change, a third shaft serving as intermediate transmission shaft for axles, the first, second and third shafts being disposed in parallel to one another and supported by a propulsion transmission case, a first shift gear splined or keyed to the first shaft and having a large width axially thereof, the second shift gear always meshing with the first shift gear, a first driven gear freely rotatably mounted on the third shaft and selectively meshable with the first gear or the second shift gear, and a second driven gear fixedly mounted on the third shaft and selectively meshable with the first shift gear or the second shift gear, thereby the rotation of the first driven gear or the second driven gear on the third shaft can be delivered to a transmission system for the axles via two transmission systems different in speed change ratio and same in direction of transmission of rotation.

Accordingly the first shift gear and second shift gear need not be provided in the form of a gear having a large-diameter gear portion and a small-diameter gear portion or of a gear assembly including a large-diameter gear and a small-diameter gear joined thereto. In fact the gears of large width are simple in shape and easy to manufacture, making it possible to provide an inexpensive assembly for the desired high or low speed change in forward or reverse drive. Because the transmission systems subsequent to the first and second driven gears on the third shaft operate commonly for both positive rotation and reverse rotation, the overall unit has a compact construction including a reduced number of parts.

An object of this invention is to provide an inexpensive and compact speed change unit composed of a reduced number of parts and adapted for high and low speed changes in forward and reverse directions.

Other objects and advantages will become apparent from the following description.

DESCRIPTION OF THE PREFERRED EMBODIMENT

Figure 1:
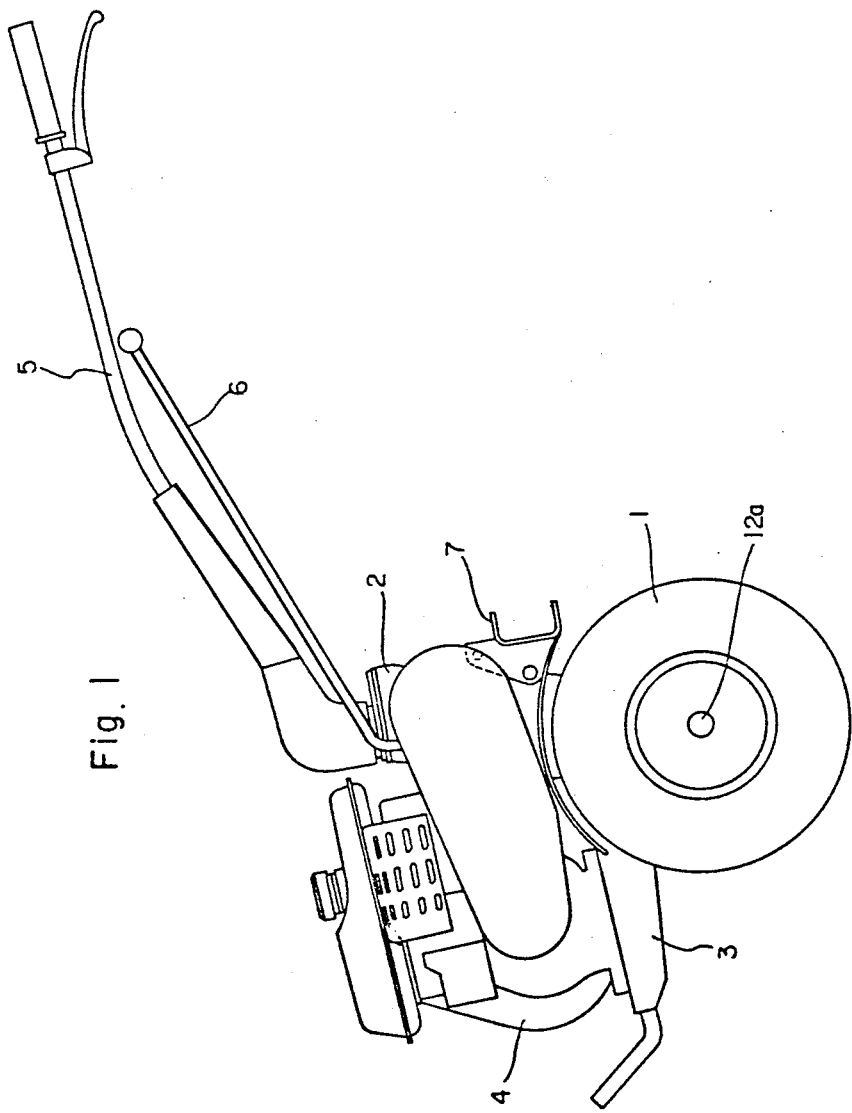
FIG. 1 is an overall side elevation showing a tiller of the type to be driven by a walking operator.

FIG. 1 shows a tiller of the type to be driven by a walking operator. A transmission case 2 supporting a pair of wheels 1, 1 is connected to an engine 4 disposed in front of the case 2 and mounted on a front frame 3. A steering handle 5 and a change lever 6 are forwardly or rearwardly shiftably attached to the top of the transmission case 2. A connector (hitch) 7 for connecting a rotary tiller unit or like attachment is secured to a rear portion of the transmission case 2.

Figure 2:
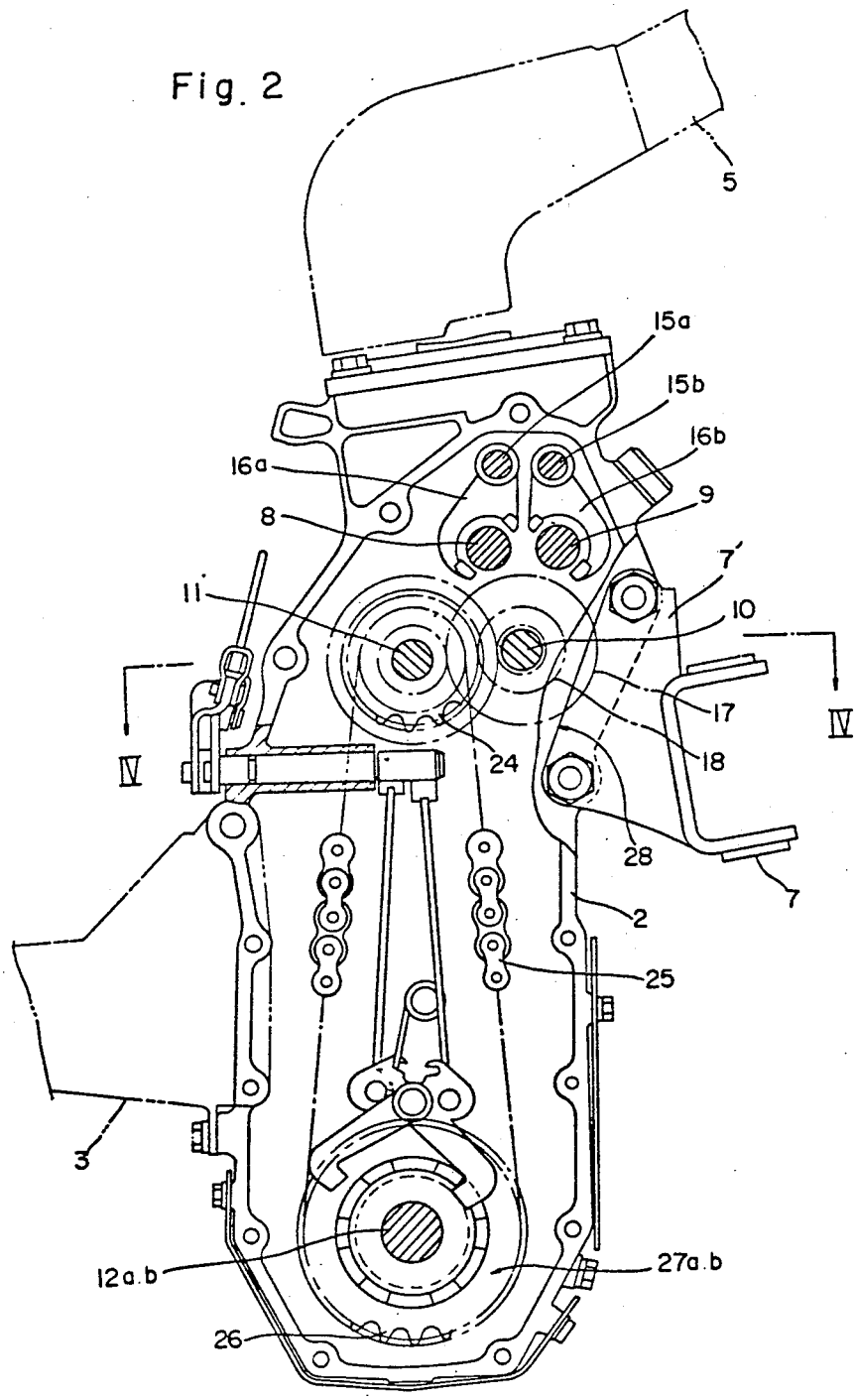
FIG. 2 is a side elevation in vertical section showing a propulsion transmission case.
Figure 3:
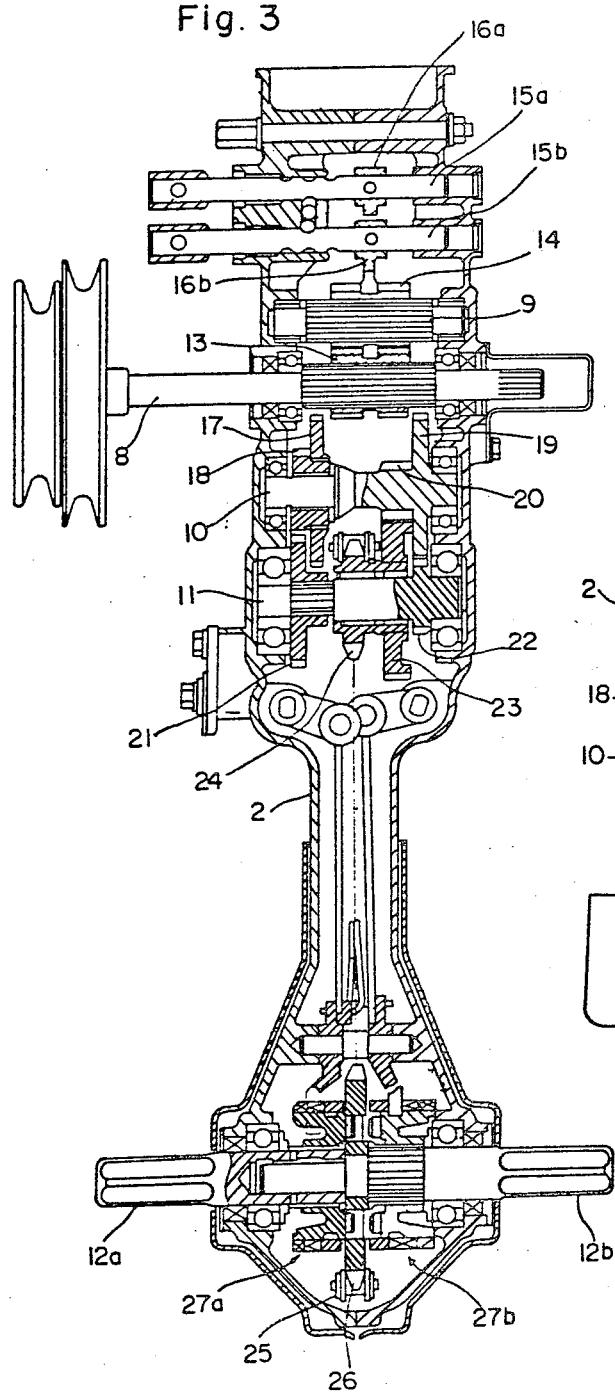
FIG. 3 is a front view in vertical section showing the transmission case.

FIGS. 2 and 3 show a change gear assembly housed in the transmission case 2 composed of a pair of divided segments. A first shaft 8 serving for speed change and also as an input shaft, a second shaft 9 for speed change, a third shaft 10 for power transmission, a fourth shaft 11, and a pair of axles 12a, 12b opposed to each other end-to-end are disposed in parallel to one another and extend between, and supported by, the opposite side walls of the case 2. A first shift gear 13 of large width for high or low speed change is splined to the first shaft 8. A second shift gear 14 of large width for forward or reverse drive change is splined to the second shaft 9 and always meshes with the first shift gear 13. The shift gears 13, 14 are engaged and shiftable by first and second shifting forks 16a, 16b secured to a pair of first and second shift shafts 15a, 15b axially slidably supported at an upper portion of the transmission case 2.

A first driven gear 17 of large diameter and a gear 18 of small diameter integral therewith are freely rotatably mounted on one end of the third shaft 10. The gear 17 is meshable with the first and second shift gears 13, 14. The third shaft 10 fixedly carries at the other end thereof a second driven gear 19 of large diameter and a small-diameter gear 20 integral with the gear 19. The gear 19 is meshable with the first and second shift gears 13, 14.

A gear 21 of large diameter always meshing with the small-diameter gear 18 is fixedly mounted on one end of the fourth shaft 11, while a gear 22 of small diameter always meshing with the large-diameter gear 19 is secured to the other end of the shaft 11. A large-diameter gear 23 meshing with the small-diameter gear 20 and integral with a transmission sprocket 24 for the axles is freely rotatably mounted on the fourth shaft 11 at an intermediate portion thereof.

The sprocket 24 is operatively connected to the pair of axles 12a, 12b by a chain 25, a sprocket 26 and opposite steering clutches 27a, 27b.

When the first shift shaft 15a in the foregoing assembly is shifted leftward, the rotation of the first shaft 8 is delivered to the sprocket 24 by way of the transmission system of: the gear 13 → gear 17, gear 18 → gear 21, fourth shaft 11, gear 22 → gear 19, gear 20 → gear 23. The axles 12a, 12b are therefore driven in the positive direction at a low speed. When the first shift shaft 15a is shifted rightward, the rotation of the first shaft 8 is transmitted to the sprocket 24 via the transmission system of: the gear 13 → gear 19, gear 20 → gear 23. The axles 12a, 12b are driven in the positive direction at a high speed.

Further when the second shift shaft 15b is shifted leftward, the rotation of the first shaft 8 is delivered to the transmission system of: gear 13 → gear 14 → gear 17. The rotation is then delivered to the sprocket 24 via the same transmission system as in the case of the above-mentioned positive low-speed rotation, giving reverse low-speed rotation to the axles 12a, 12b. When the second shift shaft 15b is shifted rightward, the rotation of the first shaft 8 is delivered to the transmission system of: the gear 13 → gear 14 → gear 19. The rotation is then delivered through the same transmission system as in the case of the aforesaid positive high-speed rotation to the sprocket 24, giving reverse high-speed rotation to the axles 12a, 12b.

Either one of the first and second shift shafts 15a, 15b is selected by upward or downward pivotal movement of the change lever 6, and the selected shift shaft is shifted by leftward or rightward pivotal movement of the change lever 6. More specifically, forward or reverse drive is selected by upward or downward movement of the change lever 6, while high or low speed is selected by leftward or rightward movement of the lever. Thus the speed change assembly is adapted for two forward and two reverse speed changes.

Figure 5:
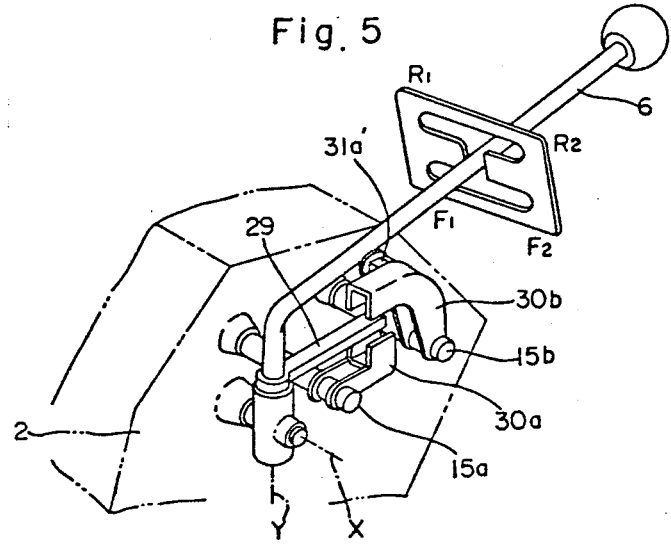
FIG. 5 is a perspective view of a change lever assembly.
Figure 6:
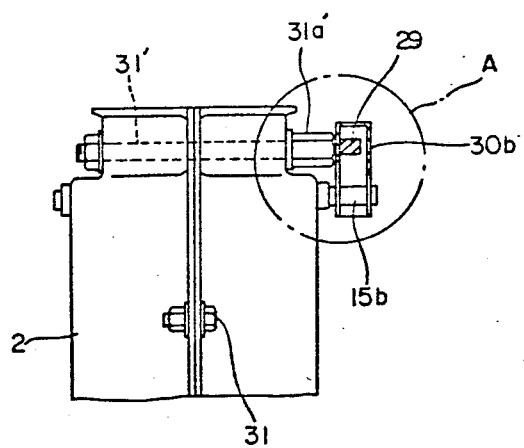
FIG. 6 is a front view showing an upper portion of the transmission case.
Figure 7:
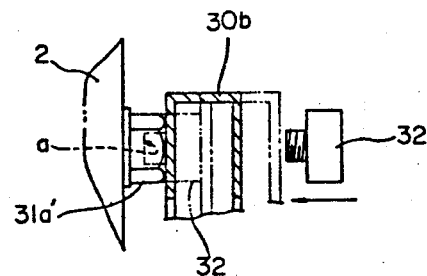
FIG. 7 is a front view showing another embodiment of the part A of FIG. 6.

FIG. 5 shows a change lever assembly. A lever supporting bracket 28 pivotable about a horizontal axis X is connected to a lateral side portion of the transmission case 2. The change lever 6 is supported by a boss portion at the top end of the bracket 28 and is pivotally movable about a vertical axis Y. A change arm 29 extends forward from the lever 6. The first and second shift shafts 15a, 15b project from the lateral side portion of the transmission case 2. The projections are provided with end pieces 30a, 30b engageable with the forward end of the change arm 29 from above and below. While the change arm 29 is engagement with either the piece 30a or 30b, with the change lever 6 in its raised or lowered position, the change lever 6 is moved leftward or rightward, thereby projecting or retracting the end piece 30a or 30b, whereby the first shift shaft 15a or the second shift shaft 15b is projected from the transmission case 2 to effect a speed change to low or retracted into the case 2 for a speed change to high.

With the handle directed in the usual direction as seen in FIG. 1, a forward low speed $F_1$ is available when the change lever 6 in its lowered position is shifted rightward, while a forward high speed $F_2$ is available when it is shifted leftward. Further the change lever in its raised position gives a reverse low speed $R_1$ when shifted rightward or a reverse high speed $R_2$ when shifted leftward. Incidentally if the handle is directed in the opposite direction to the above longitudinally of the tiller, the first and second shift shafts 15a, 15b operate in reverse relation to the foregoing in giving forward and reverse speeds, but the change lever 6 gives the respective speeds in the same relation to the above when manipulated vertically and horizontally.

The transmission case 2 is composed of two left and right divided segments. The segments are joined face-to-face into the case by bolts 31.

Among the bolts 31 used for joining the segments, a bolt 31' located close to the portion where the first and second shift shafts 15a, 15b are supported is provided with a head 31a' which is disposed in such position that it can contact the end piece 30b on the second shift shaft 15b for high or low speed change during reverse drive when the handle is oriented in the usual direction shown in FIG. 1. The head 31a' provides a projection on the transmission case 2 so as to prevent the end piece 30b from shifting to the high speed position by contact therewith. Thus the contact between the head 31a' of the bolt 31' and the end piece 30b renders the reverse high speed unavailable.

Figure 4:
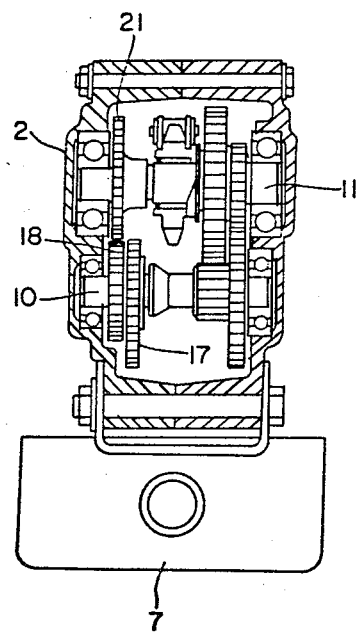
FIG. 4 is a view taken along the line IV—IV in FIG. 2.

Alternatively the head 31a' of the bolt 31' may be formed with an internally threaded portion a in which a separate contact member 32 may be detachably screwed as shown in FIG. 4 so as to preclude the reverse high speed by the contact of the contact member 32 with the end piece 30b.

What is claimed is:

1. A speed change unit for a tiller comprising a first shaft for speed change serving as an input shaft, a second shaft for speed change, a third shaft serving as an intermediate transmission shaft for axles, the first, second and third shafts being disposed in parallel to one another and supported by a propulsion transmission case, a first shift gear splined or keyed to the first shaft and having a large width axially thereof, a second shift gear splined or keyed to the second shaft and having a large width axially thereof, the second shift gear always meshing with the first shift gear, a first driven gear freely rotatably mounted on the third shaft and selectively meshable with the first shift gear or the second shift gear, and a second driven gear fixedly mounted on the third shaft and selectively meshable with the first shift gear or the second shift gear, thereby the rotation of the first driven gear or the second driven gear on the third shaft can be delivered to a transmission system for the axles via two transmission systems different in speed change ratio and same in the direction of transmission of rotation.

* * * * *